United States Patent

Quigley et al.

[11] Patent Number: 5,888,288
[45] Date of Patent: Mar. 30, 1999

[54] FORMING SOLUTIONS OF CELLULOSE IN AQUEOUS TERITARY AMINE OXIDE

[75] Inventors: Michael Quigley, Coventry; Roger James Rees Armistead, Stockport, both of United Kingdom; Rainer Naef, Dietikon, Switzerland; Andrew Ronchetti, Wellesbourne, United Kingdom; Werner Nussberger, Allschwil, Switzerland; Katharine Anne Ronchetti, Wellesbourne, United Kingdom

[73] Assignees: Acordis Fibres (Holdings) Limited, United Kingdom; Buss AG, Switzerland; Akzo Nobel Faser AG, Germany

[21] Appl. No.: 875,437
[22] PCT Filed: Jan. 9, 1996
[86] PCT No.: PCT/GB96/00029
§ 371 Date: Dec. 23, 1997
§ 102(e) Date: Dec. 23, 1997
[87] PCT Pub. No.: WO96/21678
PCT Pub. Date: Jul. 18, 1996

[30] Foreign Application Priority Data

Jan. 10, 1995 [GB] United Kingdom ............... 9500388

[51] Int. Cl.$^6$ .................................................. C08L 9/02
[52] U.S. Cl. ........................... 106/200.3; 106/200.2
[58] Field of Search ................. 106/200.2, 200.3

[56] References Cited

U.S. PATENT DOCUMENTS 4,196,282  4/1980  Franks et al. .
4,246,221  1/1981  McCorsley, III .
5,094,690  3/1992  Zikeli et al. .
5,330,567  7/1994  Zikeli et al. .
5,337,776  8/1994  Perry et al. .
5,413,631  5/1995  Gray et al. .
5,419,810  5/1995  Van Der Piepen et al. .

FOREIGN PATENT DOCUMENTS 0 356 419    2/1990   European Pat. Off. .
WO 92/19370  11/1992  WIPO .
WO 94/06530  3/1994   WIPO .
WO 94/28214  12/1994  WIPO .
WO 94/28217  12/1994  WIPO .

Primary Examiner—David Brunsman
Attorney, Agent, or Firm—Howson and Howson

[57] ABSTRACT

A method is described for forming a solution of cellulose in a tertiary amine oxide (such as N-methylmorpholine N-oxide) and a non-solvent for cellulose (such as water). The method involves the preparation of a mixture containing excess non-solvent, and removing the excess by heating the mixture to a temperature in excess of the boiling point of the non-solvent at a predetermined sub-atmospheric pressure, and feeding the heated mixture into the introduction zone of a mixing chamber at the predetermined sub-atmospheric pressure, so as to cause flash evaporation of some of the excess non-solvent. The mixture in the mixing chamber is then agitated by a rotor and transported through the mixing chamber whilst further evaporation of the non-solvent occurs. The cellulose solution thus formed is extracted from the mixing chamber, and the evaporated non-solvent withdrawn in cocurrent mode from the same end of the mixing chamber. Apparatus for carrying out the method is also described.

13 Claims, 1 Drawing Sheet

FORMING SOLUTIONS OF CELLULOSE IN AQUEOUS TERITARY AMINE OXIDE

This invention relates to methods of forming solutions and has particular reference to methods of forming solutions of cellulose in aqueous tertiary amine oxide, particularly aqueous N-methylmorpholine N-oxide (NMMO).

It is well known that cellulose can be dissolved in aqueous solutions of NMMO. It is also well known that such solutions can conveniently be prepared by subjecting a mixture (hereafter referred to as a "premix") of cellulose, NMMO and excess water (which is a non-solvent for cellulose) to conditions of heat and reduced pressure so as to convert the premix into a solution of cellulose in aqueous NMMO by removal of excess water. Such a process is, in general terms, described in Franks and Varga U.S. Pat. No. 4,196,282.

The process of heating a premix under conditions of reduced pressure can be carried out in batches or in a continuous process. Both batch and continuous processes are described in McCorsley U.S. Pat. No. 4,246,221. In the continuous process, as described in McCorsley U.S. Pat. No. 4,246,221, and as also described in EP 356,419, and as further described in published International Application WO 94/06530, the process involves heating a premix by bringing it into contact with a heated surface whilst subjecting the premix to reduced pressure and simultaneously agitating the premix.

All of these processes will produce solutions of cellulose in aqueous NMMO.

Considering, however, the process in which the premix is heated under reduced pressure in a thin film evaporator such as a Filmtruder (Registered Trademark) thin film evaporator, available from Buss AG of Pratteln, Switzerland essentially there is provided a rotatable rotor within an externally heated cylinder which agitates the premix and then the solution as it is formed during its passage through the Filmtruder. The process of forming the cellulose solution is described in a schematic manner in EP-B-356,419, but there is no disclosure therein of the conditions for operating the process at the high production rates required for commercial operation. According to the description and as claimed in EP 356,419 it is of decisive importance to the continuous control of the process that the water vapour be drawn off in counterflow relative to the product transport.

In the process described in WO 94/06530 in which it is described how to operate a solution forming process on a large and practical scale, the Filmtruder is also described as operating in a countercurrent mode. When this process is operated in a large scale Filmtruder at an ever increasing throughput, to increase its productivity, it has now been found that lyocell fibre produced from cellulose solutions made at the higher rate can on occasions become discoloured.

A method and apparatus has now been developed which overcome these problems and the present invention requires the operation of a process and equipment in direct contradiction to the teachings of EP-B-356,419.

By the present invention there is provided a method of converting a mixture of cellulose, tertiary amine oxide and excess non-solvent, such as water, to a solution of cellulose in tertiary amine oxide containing a reduced amount of the non-solvent, wherein the improvement comprises in combination the steps of: heating the mixture to a temperature in excess of the boiling point of the non-solvent at a predetermined sub-atmospheric pressure; continuously feeding the thusly heated mixture into the introduction zone of a mixing chamber at the predetermined sub-atmospheric pressure so as to cause flash evaporation of some of the excess non-solvent so that some at least of the cellulose goes into solution in the tertiary amine oxide closely adjacent to the introduction zone of the mixing chamber; providing in the mixing chamber a rotor which agitates the thusly formed solution and the remaining mixture of cellulose, tertiary amine oxide and excess non-solvent; transporting the solution and the remaining mixture through the mixing chamber whilst continuing evaporation of excess non-solvent to form further solution; and extracting the solution continuously from the mixing chamber, the evaporated non-solvent being withdrawn in a cocurrent mode from the same end of the mixing chamber as the solution.

The mixing chamber is preferably in the form of a vertical cylindrical member having located therein a central rotor provided with a plurality of laterally extending blades, the tips of which blades terminate in contact with or adjacent to the inner wall of the cylinder, the lower end of the rotor extending into a discharge region of the mixing chamber, the discharge region having a discharge port for the solution and one or more a discharge ports for the evaporated non-solvent.

The solution may be positively moved into the discharge port for the solution. The discharge region may be a frustoconical member with the discharge port for the solution at the lower apex of the frustoconical member and the discharge port for the evaporated non-solvent being a lateral port at the upper end of the frustoconical member. The cylindrical portion preferably has a lower cylindrical skirt extending into the discharge region, with an annular space of the discharge region surrounding the skirt, the discharge port or ports for the evaporated non-solvent being provided laterally of the annular space.

The temperature of the wall of the mixing chamber is preferably controlled.

The temperature of the wall may be controlled so that heat is always removed from the wall of the mixing chamber so that no heat is introduced into the mixture and the thermal stability thereof is maintained. Energy may be introduced into the mixture and the solution as it is formed by rotation of the rotor. In an alternative process heat may be introduced through the wall of the mixing chamber to supplement the energy provided by rotation of the rotor.

The mixing chamber is preferably a vertically oriented cylindrical chamber containing a rotor having a plurality of laterally extending mixing and transporting blades.

The mixture may be preswollen before being heated.

The mixture may be introduced at temperatures in excess of 5° or 10° or 15° or 20° or 25° or 30° or 35° or 40° or 45° or 50° C. or 60° C. or 70° C. or 80° C. above the boiling point of the non-solvent, such as water, at the reduced pressure obtaining in the mixing chamber. The mixture may be at a temperature in the range 85° C. to 160° C. or 90° C. to 150° C. The mixing chamber may be a thin film evaporator. The preferred brand of the thin film evaporator is a Filmtruder (registered trademark) obtainable from Buss AG, Switzerland.

The water content of the mixture may be in the range 10% to 40% by weight, the cellulose content may be in the range 3% to 20% by weight and the balance being tertiary amine oxide, the proportion of the components being so selected that removal of excess water results in the formation of a solution of cellulose in aqueous tertiary amine oxide.

There may be provided heating means for the wall of the mixing chamber to heat the contents as the mixture is converted into solution.

The present invention also provides apparatus for carrying out the process of the invention, there being provided: a vertically oriented cylindrical member having at its upper end an inlet for feed material and at its lower end a discharge port for solution; a rotor rotatable within the cylinder for the agitation and transport of material downwardly through the cylinder; at least one discharge port for volatile evaporated material being connectable to a vacuum line; and a discharge region at the lower end for discharging solution, wherein the improvement comprises providing integrally with the lower end of the rotor positive displacement means positively to force solution through the discharge port for solution.

By way of example, embodiments of the present invention will now be described with reference to the accompanying drawings in which:

BRIEF DESCRIPTION OF THE DRAWINGS

Referring to FIG. 1 this graph, which is a three component phase diagram and which is derived from Franks and Varga U.S. Pat. No. 4,196,282 shows that cellulose forms a solution in aqueous amine oxide, in this case N-methylmorpholine N-oxide, over only a limited range. Typically the cellulose is soluble in a region A defined by lines connecting points 1,2 and connecting points 3,4 where point 1 represents about 32% cellulose, point 2 represents about 15% water, point 3 represents about 35% cellulose and point 4 represents about 20% water.

Figures 1, 2, 3:
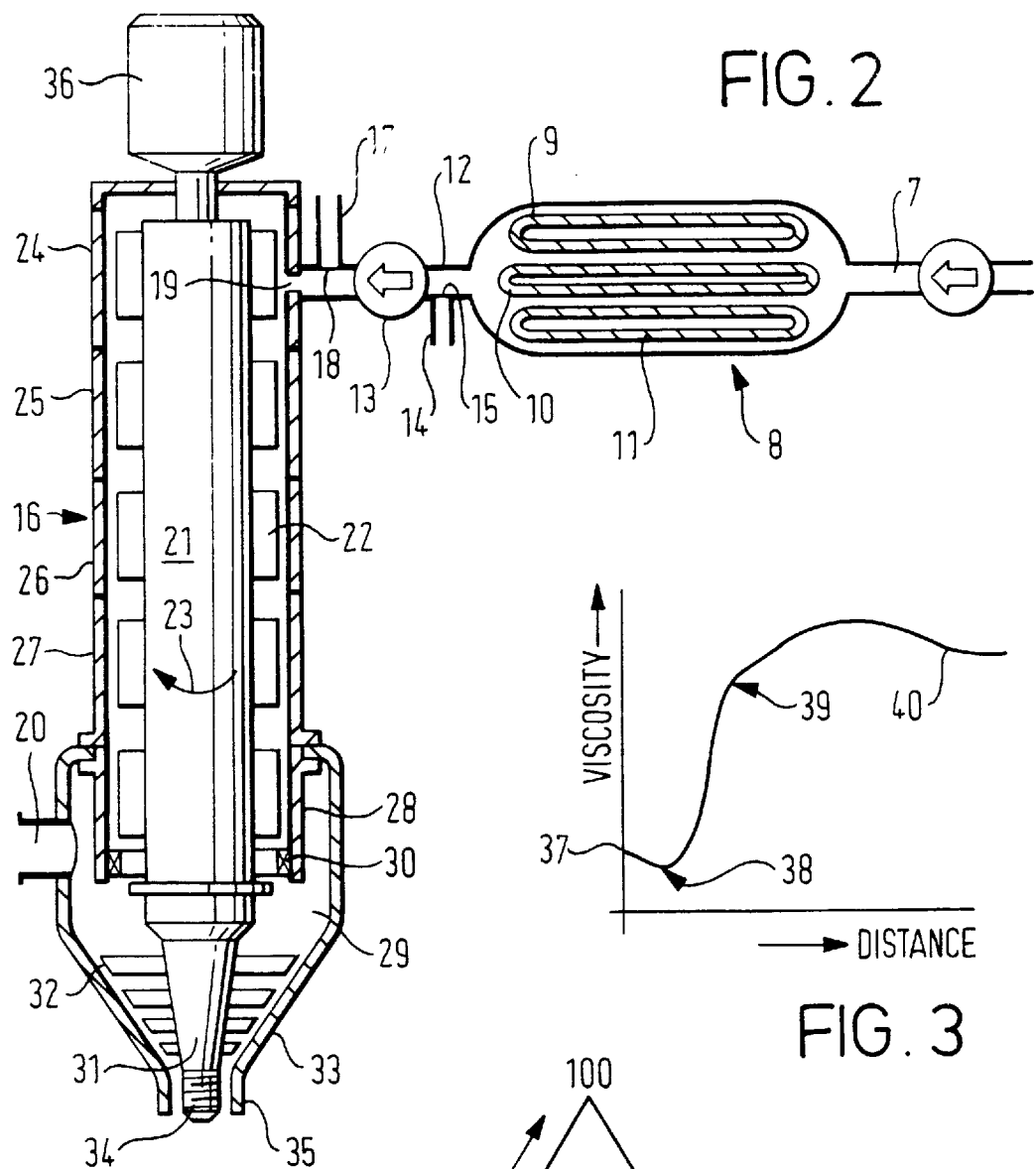
FIG. 1 is a graph showing the solubility of cellulose in amine oxide water mixtures.
FIG. 2 is a schematic cross section of one embodiment of apparatus for performing the process of the present invention.
FIG. 3 is a schematic graph of viscosity against distance.

In the region B cellulose exists in the form of cellulosic fibres in an intimate mixture of water and amine oxide. Water and amine oxide are miscible over the entire range 0% to 100% of each component. In the region C the solution of cellulose contains crystals of NMMO.

As described in Franks and Varga U.S. Pat. No. 4,196,282 and as described in McCorsley U.S. Pat. No. 4,246,221 the solution in the region A is created by forming a mixture having the three components such as those identified by the point 5 in region 3 and heating the mixture under reduced pressure so as to evaporate excess water to produce a solution having the composition at point 6 in region A.

FIG. 2 illustrates a preferred embodiment of apparatus for carrying out the process of the invention to remove excess water from a mixture of cellulose, water and NMMO to produce a solution of cellulose in aqueous NMMO. A stabilised premix comprising 13.5% cellulose and 86.5% NMMO/water in which the NMMO is present at a concentration of 78% in the NMMC/water mixture is passed through line 7 into a suitable heating apparatus 8. Any suitable stabiliser such as propyl gallate can be used. Within the apparatus there are provided a number of heating tubes 9,10,11 which heat the mixture to 120° C.

The mixture may be prepared in any suitable apparatus such as that described in our published International Application WO94/28217 and simply pumped through line 7 from a storage hopper such as that described in our published International Application WO94/28214. The mixture is preferably preswollen i.e. the cellulose in the mixture is permitted to absorb the NMMO and water to cause it to swell. Heated mixture is then passed through pipe 12 to a pump 13. The pipe 12 may be provided with a safety vent 14 incorporating a bursting disc 15 particularly such a disc as is described in U.S. Pat. No. 5,337,776. Downstream of the pump 13 the hot mixture is pumped into a Filmtruder (RTM) thin film evaporator indicated generally by 16. Again a safety vent 17 with a bursting disc 18 may be provided between the Filmtruder and the pump 13. Access to the body of the thin film evaporator is via a constriction 19. If required there may be two; three or more access points for mixture, spread around the periphery of the body.

The Filmtruder is maintained at sub-atmospheric pressure—typically 30 to 100 millibars—by being connected to a condenser and vacuum pump via an exit 20. Within the thin film evaporator 16 there is provided a rotor indicated generally by 21 which has a series of distribution blades and inclined or transporter blades 22 around its surface. The rotor 21 turns in the direction of arrow 23 so that the inclined blades which are spaced slightly from the inner wall of the cylinder pick up the material being fed through the constriction 19 and transport it down the length of the Filmtruder. As soon as the mixture enters the evacuated Filmtruder some of the water in the mixture is flashed off as steam. The boiling point of the water in the mixture, when the mixture is held at 50 millibars, is about 80° C. The mixture, therefore, enters the Filmtruder at a temperature 40° above the boiling point of the water within the mixture. Consequently, some of the excess water immediately flashes off as steam, and some of the cellulose in the mixture immediately goes into a solution. There is thus formed a re-solution of undissolved cellulose in the remaining mixture, which still contains excess water.

The rotor blades 22 pick up the re-solution, i.e. the solution/mixture and transport it down through the thin film evaporator 16. Cooling jackets are provided on the thin film evaporator as at 24,25,26 and 27 to increase the viscosity to enable energy to be put into the mixture. The rotor is rotated by an electric motor 36 and so much energy has to be put into the system to rotate the rotor 21 that the energy is used to evaporate water from the mixture/solution. Any excess energy appears as heat which is removed by the cooling jackets 24,25,26 and 27. By zoning the cooling jackets, the temperature of the mixture/solution can be adjusted vertically down the Filmtruder so that the optimum conditions in the zones of the Filmtruder can be arrived at with the top zone held at a temperature in the range 75° C. to 100° C., for example 80° C., the lower zone at a temperature in the range 90° C. to 110° C. for example at 95° C. and the intermediate zones at intermediate temperatures. At the bottom of the Filmtruder the cylindrical wall extends downwardly in the form of a skirt 28 into a vacuum chamber 29 from which the vaporised contents of the Filmtruder are extracted through the exit 20. The lower end of the rotor 21 is provided with a bearing 30 in the form of radially extending fingers which contact the inner surface of the lower end of the skirt 28. The bearing may contact the inner surface of the body further up the wall or further down into the cone. Extending downwardly beneath the skirt 28 is a portion of the rotor 31 which carries blades 32 which conform approximately to the frustoconical lower portion 33 of the chamber 29. The portion 31 which carries the blades 32 is bolted to the bottom of the rotor 21. The portion 31 is provided with a threaded portion 34 which extends into a cylindrical exit portion 35 of the chamber 29.

The mixture of cellulose NMMO and excess water entering the entry port 19 of the Filmtruder has evaporated from it sufficient excess water by the time it reaches the bottom of the Filmtruder so that the cellulose goes into the solution of aqueous NMMO. The excess water is converted into water vapour and is carried in cocurrent mode through the Filmtruder being extracted at the bottom through the exit 20. The solution also is extracted at the bottom through the cylindrical portion 35 of the lower chamber 29.

Referring to FIG. 3 this shows a notional graph of the "viscosity" of the mixture and solution as it is processed through the method of the invention. Because the solution is non-Newtonian, actual figures require the shear rate to be given, but if the shear rate is constant a nominal graph can be drawn. The nominal viscosity of the mixture at point 37 constitutes the viscosity of the material in the pipe 7. This viscosity is in reality that of the aqueous amine oxide. As the material is heated up in the heating apparatus 8 the viscosity falls, so that at point 38 the viscosity is at its lowest just at the point that the hot premix enters the Filmtruder. The viscosity immediately increases to the point 39 as a result of flashing off of steam and the formation of the "presolution". The viscosity thereafter gradually increases and then declines to point 40 as the cellulose goes into solution. The solution emerges from the bottom of the Filmtruder through cylindrical exit portion 35.

Because the mixture entering the Filmtruder is preheated to a temperature of 120° C., the mixture is subject to immediate vaporisation of some of the excess water as it enters into the Filmtruder. This is referred to as flashing. Some energy is then put into the re-solution immediately it is formed by the action of the blades 22 which are turned with the rotor 21 by a suitable motor 36. It will be appreciated that the blades 22 distribute the mixture and the solution as it is formed in the form of a thin film down the inside wall of the Filmtruder in the conventional manner. The agitation and energy put into this film by the blades occurs at the very interface between the cellulose containing solution or re-solution and the central region of the Filmtruder exposed to the low pressure by means of the vacuum pump and condenser connected to exit 20. This means that energy can be put into this mixture to form the solution just at the point where excess water can be evaporated.

It is possible, therefore, to control the temperature of the solution as it is formed by cooling the walls of the cylinder via the jackets 24,25,26 and 27.

In regions where electricity is cheap, for example, in regions where hydroelectric power is readily available, it may be desirable to put all the energy into the system via an electric motor 36 or from an hydraulic motor 36 which in turn derives its energy from an electric motor driving an hydraulic pump.

Alternatively, if steam costs are lower than electrical costs it is still possible to use an electrically powered rotor motor (which can be a direct motor or a hydraulically driven motor again from an electrically powered hydraulic pump) with steam heating on the jackets of the Filmtruder. It will also be appreciated that other heating media such as oil or water could be used. A particular advantage of the process of the invention is that by flashing some of the water vapour off the mixture as it enters the Filmtruder sensible heat can be introduced via the heat exchanger 8 so that the overall efficiency of the process is increased.

One use of the solution of cellulose is to produce lyocell fibres, that is cellulose fibres formed by a direct dissolution route as defined by the Bureau International de Fibres Synthetic BISFA.

It has been discovered that when attempts are made to increase the productivity of the lyocell production process using Filmtruders operating in countercurrent, discolouration of the fibre can occur irregularly. It will be appreciated that for any large piece of capital equipment such as a fibre production plant, depreciation is a significant factor in its economics. Thus for any given piece of capital equipment the more product that can be processed through that equipment the better. However, when merely attempting to increase the throughput by processing greater amounts of solution whilst still using a countercurrent device in the way said to be necessary in EP-B-356,419, even using the process of WO94/06530 it has been discovered that discoloration of fibre produced from the solution manufactured in the Filmtruder occurs. It is now believed, without prejudice to the invention, that this arises in the following manner.

When the mixture enters into the evacuated mixing chamber and the mixture is sufficiently hot for sufficient flashing to occur at the internal pressure in the Filmtruder; the flashing causes in effect steam disintegration of the mixture into fine particles. Some of the smallest particles of the mixture can be carried upwardly in the vacuum extraction line of a Filmtruder operating in countercurrent mode. These particles build up in the upper regions of the Filmtruder operating in the countercurrent mode until the layers built up are too heavy to be self-supporting. During the gradual build up of the layers of cellulose amine oxide and water, degradation of the material may occur resulting in discoloration of the cellulose in the portion in the built-up layers.

When the layers reach a weight too great to be self-supporting, portions of the material fall off and fall back down into the Filmtruder. These portions are processed through the Filmtruder to emerge as discoloured regions in the solution. This discolouration is carried into the fibre. It has only been found to occur when the productivity is being increased, operating at lower production rates produces no such discolouration.

With the process of the present invention, this build up and hence discolouration is overcome by moving the water vapour downwardly and extracting it from the bottom. This means that there is no build up of layers of material as all material is flushed through the Filmtruder by the current of water vapour moving in the same direction as the solution moving through the Filmtruder. It has been found that the solution does not contain particles of undissolved cellulose, so the disintegrated particles formed after flashing are being carried down into the Filmtruder and are dissolving.

Because the solution of cellulose in aqueous amine oxide can deteriorate with time, and because it is a non-newtonian mixture it has also been found to be highly desired to have a positive displacement of the solution out of the bottom of the cocurrent Filmtruder. Because the solution is non-newtonian there is otherwise a danger that a flow path of formed solution in the bottom of the Filmtruder would be set up with a central region through which the solution would be moving and hence have a lower viscosity and an outer region adjacent the walls in which the solution would be more static and hence have a higher viscosity. In this outer region degradation could occur.

Thus the process of the present invention provides a significant advance over the processes proposed before. Furthermore, the process of the present invention can be used in conjunction with the process described and claimed in International Patent Application WO 94/06530 thus enabling still further increases in productivity to occur.

In one embodiment because energy is put into the mixture directly through the rotating rotor 21, energy can be transferred directly into the mixture and the solution as it is formed without needing any thermal conduction through the wall of the apparatus 16. It may, therefore, be possible to operate the Filmtruder with the mixture and the solution at a higher temperature than would be possible with an externally heated piece of equipment. In another embodiment, the walls of the apparatus 16 may be heated, to take advantage of any relatively cheaper steam than electricity costs.

Vapour removed from the thin film evaporator 16 may be spray condensed to remove any carried over pulp amine oxide and water mixtures.

The heater unit 8 may be located after the pump 13 rather than before the pump 13. Any suitable heater unit may be used but a scraped wall heater is preferred.

The process of the invention, therefore, gives a new freedom to the designer of equipment for the formation of the solution. It is not necessary to use a Filmtruder for the process, although that is the preferred piece of equipment. Trials of the process and apparatus in accordance with the invention have demonstrated that significant increases in output may be obtained by using the Filmtruder in cocurrent mode in accordance with the invention compared to using the same Filmtruder operating in countercurrent. At least a 40% increase in production has been obtained, although it is possible that some of the increase in production is associated with an increase in the surface area of the Filmtruder when a previously countercurrent Filmtruder is converted to operate in cocurrent.

We claim:

1. A method of converting a mixture of cellulose, tertiary amine oxide and excess non-solvent to a solution of cellulose in tertiary amine oxide containing a reduced amount of the non-solvent, which comprises the steps of heating the mixture to a temperature in excess of the boiling point of the non-solvent at subatmospheric pressure; continuously feeding the thusly heated mixture into the introduction zone of a mixing chamber at said subatmospheric pressure so as to cause flash evaporation of some of the excess non-solvent so that at least some of the cellulose goes into solution in the tertiary amine oxide closely adjacent to the introduction zone of the mixing chamber; providing in the mixing chamber a rotor which agitates the thusly formed solution and the remaining mixture of cellulose, tertiary amine oxide and excess non-solvent; transporting the solution and the remaining mixture through the mixing chamber whilst continuing evaporation of excess non-solvent to form farther solution, and extracting the solution continuously from the mixing chamber, the evaporated non-solvent being withdrawn in a cocurrent mode from the same end of the mixing chamber as the solution.

2. The method of claim 1 in which the mixing chamber is in the form of a vertical cylindrical member having located therein a central rotor provided with a plurality of laterally extending blades, the tips of which blades terminate in contact with or adjacent to the inner wall of the cylinder, the lower end of the rotor extending into a discharge region of the mixing chamber, the discharge region having a discharge port for the solution and at least one discharge port for the evaporated non-solvent.

3. The method of claim 2 in which the solution is positively moved into the discharge port for the solution.

4. The method of claim 2 wherein the discharge region is a frusto-conical member with the discharge port for the solution at the lower apex of the frusto-conical member and the discharge port for the evaporated non-solvent is a lateral port at the upper end of the frusto-conical member.

5. The method of claim 4 in which the cylindrical portion has a lower cylindrical skirt extending into the discharge region, with an annular space of the discharge region surrounding the skirt, the discharge port for the evaporated non-solvent being provided laterally of the annular space.

6. The method according to claim 1, wherein the mixture is heated to a temperature in the range of 85° C. to 160° C. prior to introduction into the mixing chamber.

7. The method of claim 1 in which the pressure in the mixing chamber in maintained in the range of 30 mbar to 100 mbar.

8. The method according to claim 1, wherein the mixture is heated to a temperature in the range of 95° C. to 150° C.

9. The method according to claim 1, wherein the tertiary amine oxide is N-methylmorpholine-N-oxide, and wherein the non-solvent is water.

10. The method according to claim 1, wherein the mixture is preswollen prior to being heated.

11. The method according to claim 1, wherein the water content of the mixture is in the range 10% to 40% by weight, the cellulose content is in the range 3% to 20% by weight and the balance is tertiary amine oxide, and wherein the proportion of the components being selected so that removal of excess water results in the formation of a solution of cellulose in aqueous tertiary amine oxide.

12. The method according to claim 1, further comprising heating means for the wall of the mixing chamber to heat the contents as the mixture is converted into solution.

13. Apparatus for carrying out the process according to claim 1, having: a vertically oriented cylindrical member having at its upper end an inlet for feed material, and at its lower end a discharge port for solution; a rotor rotatable within the cylinder for the agitation and transport of material downwardly through the cylinder; at least one discharge port for volatile evaporated material being connectable to a vacuum line; and a discharge region at the lower end of the cylinder for discharging solution, wherein the improvement comprising positive displacement means integral with the lower end of the rotor for positively forcing solution through the discharge port for solution.

* * * * *